United States Patent [19]

Trucco

[11] Patent Number: 5,219,455
[45] Date of Patent: Jun. 15, 1993

[54] PUMP FOR ICE-CREAM MACHINES

[75] Inventor: Dario Trucco, Turin, Italy

[73] Assignee: GIANT S.r.l., Italy

[21] Appl. No.: 839,941

[22] Filed: Feb. 21, 1992

[30] Foreign Application Priority Data

Feb. 26, 1991 [IT] Italy ............................. MI91A000480

[51] Int. Cl.⁵ ............................................... B01F 15/02
[52] U.S. Cl. .................................. 417/307; 417/493; 417/503; 366/163
[58] Field of Search ..................... 417/307, 493, 503; 366/163

[56] References Cited

U.S. PATENT DOCUMENTS

| | | | |
|---|---|---|---|
| 3,387,773 | 6/1968 | De Beaumont | 417/493 X |
| 3,415,441 | 12/1968 | Kehler | 417/503 X |
| 4,147,478 | 4/1979 | Vork | 417/503 X |
| 4,259,042 | 3/1981 | Heatherly | |
| 4,779,519 | 10/1988 | Giuliano | 366/163 X |

FOREIGN PATENT DOCUMENTS

| | | | |
|---|---|---|---|
| 497208 | 11/1919 | France | 417/493 |
| 1352126 | 1/1964 | France | |
| 2592768 | 1/1986 | France | |

*Primary Examiner*—Richard E. Gluck
*Attorney, Agent, or Firm*—Lerner, David, Littenberg, Krumholz & Mentlik

[57] ABSTRACT

A pump with piston for feeding liquid mixture for ice-cream from a tank to a whipping cylinder in a machine for the production of soft-type ice-cream, comprises valve means to connect in an adjustable way the cylinder of the pump with ambient air; a check valve positioned at the inlet of the delivery duct; an offtake or by-pass duct connecting the delivery duct with the sucking duct; and a second, by-pass valve, mounted in the offtake duct.

7 Claims, 1 Drawing Sheet

PUMP FOR ICE-CREAM MACHINES

BACKGROUND OF THE INVENTION

Field of the Invention

This invention relates to a pump for ice-cream machines. More particularly, this invention relates to a pump for feeding an ice-cream liquid mixture from a tank into a whipping cylinder in a machine for the production of soft-type ice-cream.

In this kind of ice-cream machines, the liquid mixture that will become ice-cream is sent from a pasteurizing and temperature-keeping tank to a whipping cylinder, suitable for the product pasteurization as well, where it is stirred, cooled and intimately mixed with air to obtain an ice-cream which in this particular case is of the soft type.

Pumps used for this purpose are generally constituted by gear pumps or rotary pumps.

The major drawbacks of these pumps result from their poor head, the imprecision of their delivery and the poor sealing of the pumping body towards the outside when the pump is not working. All these drawbacks involve a series of inconveniences.

First of all, due to said reduced head, in these pumps the feeding means for air to be mixed with the liquid mixture consist of an open channel which freely connects, i.e. without valves, the pump with ambient air. When the machine is not working or during pasteurization, the air present in the whipping cylinder tends to separate from the mixture and reascends the delivery duct, passing through the pump and the channel and leaving in the cylinder a substantially deaerated mixture, therefore the desired soft-type ice-cream does not form.

Furthermore, when during the pump operation an overpressure occasionally creates in the whipping cylinder and in the delivery duct, the aerated and therefore foamy product comes out from said channel, thus involving obvious inconveniences.

Another inconvenience lies in the fact that when the machine is in the whipping stage without ice-cream delivery, the temperature of the discharge duct and subsequently of the pump gradually falls down to the temperature of the whipping cylinder thus forming crystals which may enter the gears and damage them.

Pumps provided with pistons instead of rotary pumps have been proposed; said pumps, though having better control on head and delivery, however involve, for their configuration and application, inconveniences due to foam formation and/or to the need of being equipped with their own independent motor.

OBJECTS OF THE INVENTION

An object of this invention is to solve the aforesaid problems by proposing a pump provided with good control of head and delivery, and which can be easily manufactured and operated.

SUMMARY OF THE INVENTION

Said object is achieved by means of the present invention which relates to a pump for feeding liquid mixtures for ice-cream from a tank to a whipping cylinder in a machine for the production of soft type ice-cream, said pump being provided with a piston movable within a cylinder connected with a sucking duct of the tank and a delivery duct in the whipping cylinder, characterized in that it comprises valve means to connect in an adjustable way said cylinder of the pump with ambient air; a check valve positioned at the inlet of said delivery duct; and offtake or by-pass duct connecting said delivery duct with said sucking duct; as well as a second by-pass valve, mounted on said offtake duct.

According to a particularly advantageous aspect of the invention, the by-pass duct is connected with the sucking duct in the vicinity of the outlet of the latter in the pump cylinder.

In this way it is avoided that the liquid mixture, emulsified with air and therefore foamy, falls down again into the tank containing the non aerated liquid mixture.

The invention will be now described more in detail with reference to the accompanying drawings given for illustrative and non limiting purposes, wherein:

DESCRIPTION OF THE PREFERRED EMBODIMENTS

Figure 1:
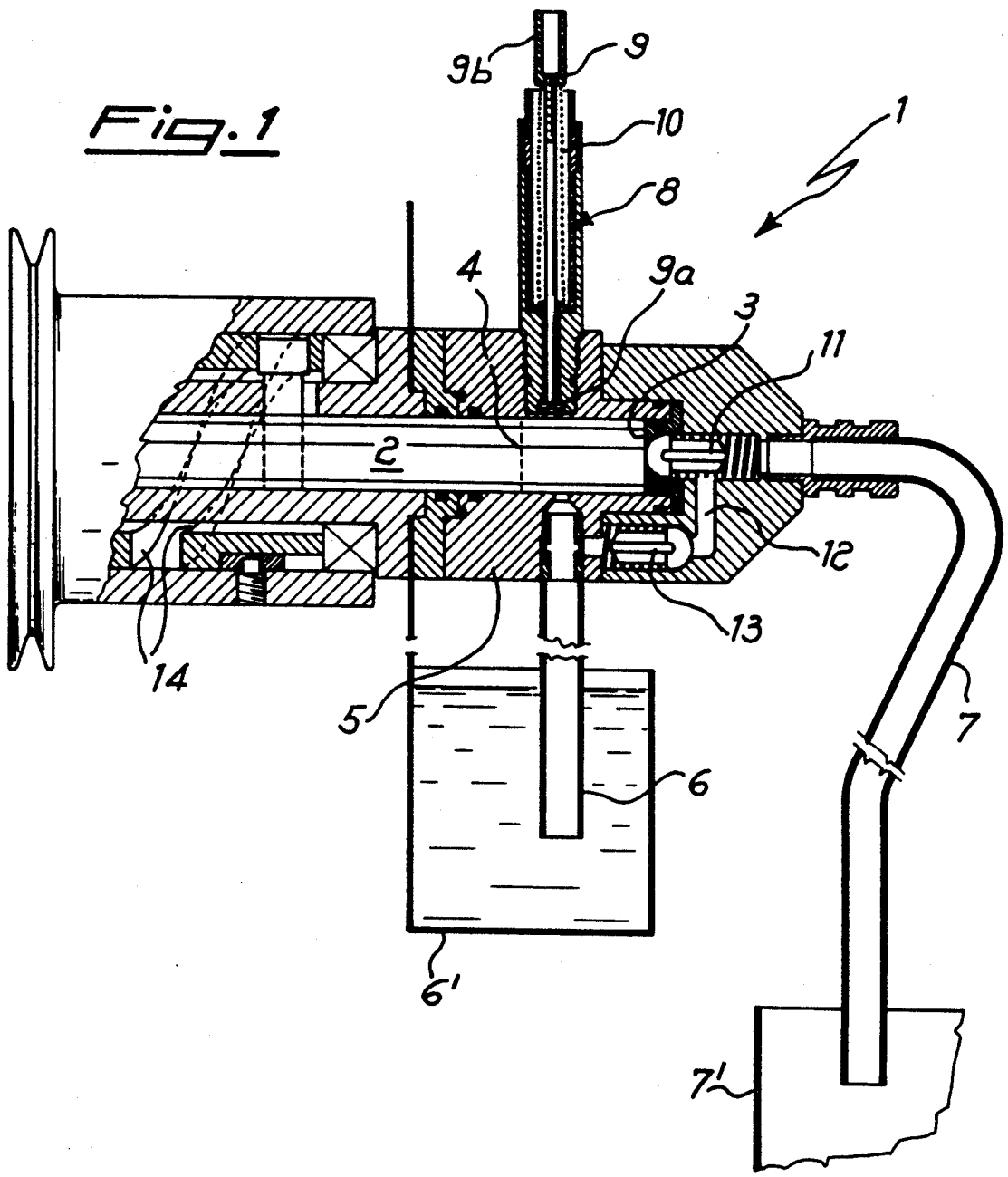
FIG. 1 represents a longitudinal section of the pump according to the invention.

As previously mentioned, the pump 1 is provided with a piston 2 movable between a top dead center 3 and a bottom dead center 4 (indicated by a dashed line) inside a cylinder 5. The cylinder 5 is connected with a duct 6 sucking the liquid mixture for ice-cream from a tank 6' and with a delivery duct 7 to feed said mixture to a whipping cylinder 7'.

On the cylinder 5 of the pump 1 there are also mounted means 8 to connect in an adjustable way the inside of the cylinder with ambient air and to allow a preset amount of air to enter the cylinder during the sucking stage.

Preferably the means 8 comprise a stem valve 9 and a sealing gasket 9a as well as a spring 10 or similar elastic means for calibrating said valve. Calibration of the valve 9 occurs as the spring 10 is compressed. In this regard, it should be understood that the degree of movement of the valve 9 towards the interior of the cylinder 5 is inversely related to the degree that the spring 10 is compressed. When the spring 10 is compressed to a large degree, it is difficult for the valve 9 to slidably move as it is limited by the large amount of force required to further move the spring 10. However, when the spring 10 is only minimally compressed, slidable movement of the valve 9 is not greatly resisted by the force of the spring 10 so that the valve 9 can more easily be moved and thus encompasses a larger range of movement. Thus, a larger volume of air is sucked into the cylinder 5 by movement of the valve 9 when the spring 10 is maintained in a minimally compressed condition. As best appreciated from FIG. 1, the degree of compression of the spring 10, and thus the calibration of the valve 9, can be controlled by means of a set screw 9b which is maintained within a threaded portion of the valve 9.

Furthermore the means 8 are positioned offset towards the bottom dead center 4 with respect to the duct 6, in a way that first the liquid mixture is sucked into the cylinder and then air.

At the inlet of the delivery duct 7 there is provided a check valve that acts in a known way to prevent the passage of mixture from the whipping cylinder 7' to the pump during the sucking stage.

Downstream of the engagement point of the valve 11 with the cylinder 5 there is an offtake duct 12 or by-pass duct, which is connected to the sucking duct 6.

Inside the duct 12 there is provided a by-pass valve 13 which is calibrated to prevent the passage of liquid mixture and air from the duct 12 to the duct 6 during normal delivery stage, allowing on the contrary said passage when an overpressure arises inside the whipping cylinder 7' and the duct 7.

In the preferential embodiment shown, the duct 12 is connected to the sucking duct 6 in the vicinity of the outlet of the latter into the cylinder 5. This position is particularly advantageous since in this way the product coming from the duct 12 remains confined inside the duct 6, without falling again into the tank containing the liquid mixture 6'.

Said confinement is however made easier by the fact that the product coming from the duct 12 is mixed with air and therefore has a lower specific weight than the liquid mixture alone present in the duct 6.

The pump 1 is motorized by means of a belt (not shown) which is driven by the stirrer shaft of the whipping cylinder. The piston 2 on its turn is actuated by means of cams 14 or, alternatively, by a system of connecting rod and crank.

The cams 14 are shaped in a way as to transmit to the piston 2 a constant speed both during the sucking stage and during the delivery stage, avoiding speed variations near the bottom and top dead centers.

Figure 2:
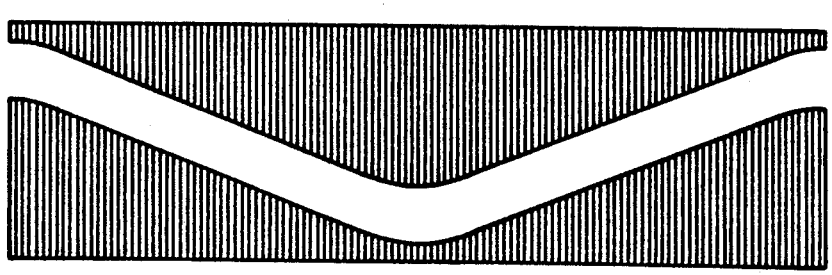
FIG. 2 shows the development of an operating cam for said pump.

The development of a cam of such a type is illustrated in FIG. 2.

During operation, the piston 2 moves from the dead center 3 to the dead center 4 sucking in sequence liquid mixture through the duct 6 and air through the means 8.

Liquid mixture and air are then sent to the duct 7 through the check valve 11.

If inside the duct 7 and the cylinder 7' mixture and air are already present in a sufficient amount, an overpressure or counterpressure arises which leads to the opening of the valve 13 and to the passage of the foamy product, due to the presence of air, into the duct 6, from which it is again sucked into the cylinder 5 in the subsequent sucking stage. The position of the duct 12 and the size of the duct 6 are such as to allow the confinement of the aerated and foamy mixture inside the duct 6.

Under said conditions, therefore, the aerated mixture is recycled between the cylinder 5, the by-pass duct 12 and the duct 6.

If moreover, when the machine is not in operation, pressure inside the duct 7 and the cylinder 7' exceeds the value corresponding to the calibration value of the valve 13, the latter opens, exhausting overpressure into the duct 6. In any case there is no loss of air necessary to the product aeration, in that the stem valve 9 and the gasket 9a sealingly close the means 8.

I claim:

1. A pump for feeding liquid mixtures for ice cream from a tank to a whipping cylinder for producing soft ice cream, said pump comprising:
   a pump cylinder;
   a piston arranged in said pump cylinder for slidable movement therein between a first position and a second position;
   a sucking duct fluidly connecting said tank to said pump cylinder at a position between said first and said second positions whereby said sucking duct is opened and closed by slidable movement of said piston between said first position and said second position;
   a delivery duct having an inlet fluidly connecting said whipping cylinder to said pump cylinder at a location proximate to said second position of said pump cylinder;
   a check valve arranged within said delivery duct adjacent said inlet;
   air valve means adjustably connected to said pump cylinder at a location between said first and second positions for controlling the amount of ambient air permitted to flow therein;
   a bypass duct fluidly connecting said delivery duct to said sucking duct; and
   a bypass valve arranged within said bypass duct between said sucking duct and said delivery duct to prevent undesired fluid flow from said sucking duct to said delivery duct.

2. The pump according to claim 1, wherein said bypass duct is connected with said sucking duct proximate to the outlet of the sucking duct in said pump cylinder.

3. A pump according to claim 1, wherein said air valve means comprises a stem valve and elastic means for calibrating said air valve means.

4. A pump according to claim 3, wherein said stem valve is provided with a sealing gasket.

5. A pump according to claim 1, wherein said first position of said pump cylinder comprises a bottom dead center and said second position of said pump cylinder comprises a top dead center, and wherein said air valve means is positioned closer to said bottom dead center than is said sucking duct.

6. A pump according to claim 1, wherein said piston is actuated by a plurality of cams adapted to transmit forces thereto.

7. A pump according to claim 6, wherein said cams are shaped in a way as to transmit a constant speed to said piston during its whole travel.

* * * * *